J. M. THOMPSON.
SAND SPREADING DEVICE.
APPLICATION FILED MAR. 7, 1916.

1,212,849.

Patented Jan. 16, 1917.
2 SHEETS—SHEET 1.

Inventor
John M. Thompson,
By Wilhelm & Parker
Attorneys.

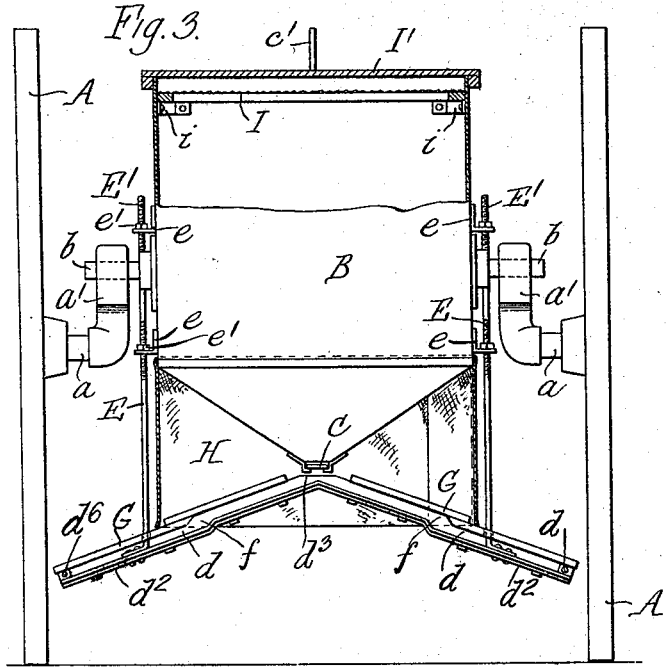
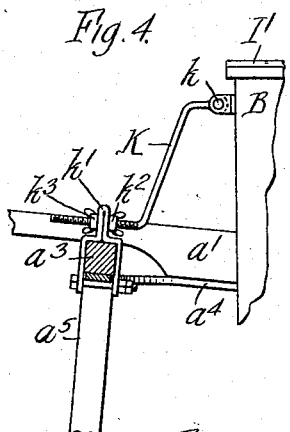
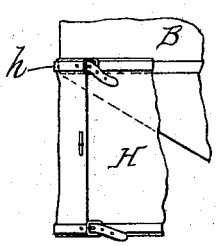
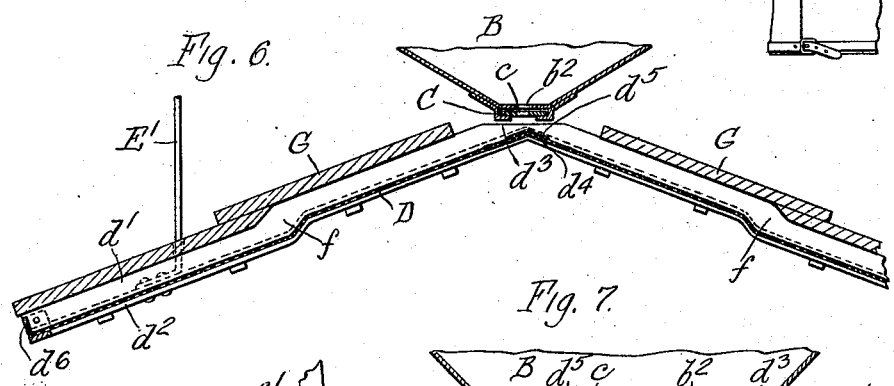
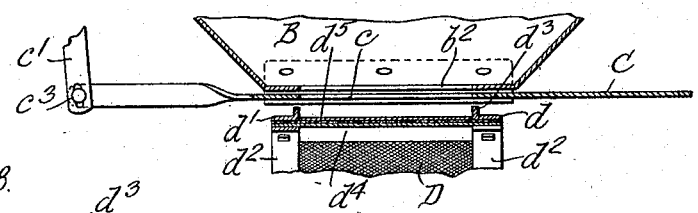
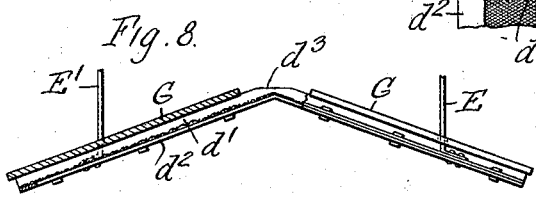

UNITED STATES PATENT OFFICE.

JOHN M. THOMPSON, OF BUFFALO, NEW YORK.

SAND-SPREADING DEVICE.

1,212,849.  Specification of Letters Patent.  Patented Jan. 16, 1917.

Application filed March 7, 1916. Serial No. 82,708.

*To all whom it may concern:*

Be it known that I, JOHN M. THOMPSON, a citizen of the United States, residing at Buffalo, in the county of Erie and State of New York, have invented a new and useful Improvement in Sand-Spreading Devices, of which the following is a specification.

This invention relates to devices or apparatus for spreading or distributing sand or analogous material over a surface, for instance, an iced walk or the like.

The objects of the invention are to provide a device of this kind by means of which sand can be uniformly spread over a comparatively large area in a short time; also to provide a device of this kind which is provided with means to insure a uniform distribution of the sand over the surface to be sanded; also to provide a device of this kind which can be removably mounted on a hand cart or truck of the kind usually employed in street sweeping or cleaning for collecting debris or the like; also to provide a device of this kind which is so constructed as to keep the sand to be spread in a dry condition and to prevent it from being blown about in falling to the surface to be sanded, when the device is used on a windy day; also to improve the construction of apparatus of this kind in other respects hereinafter specified.

Figure 1:
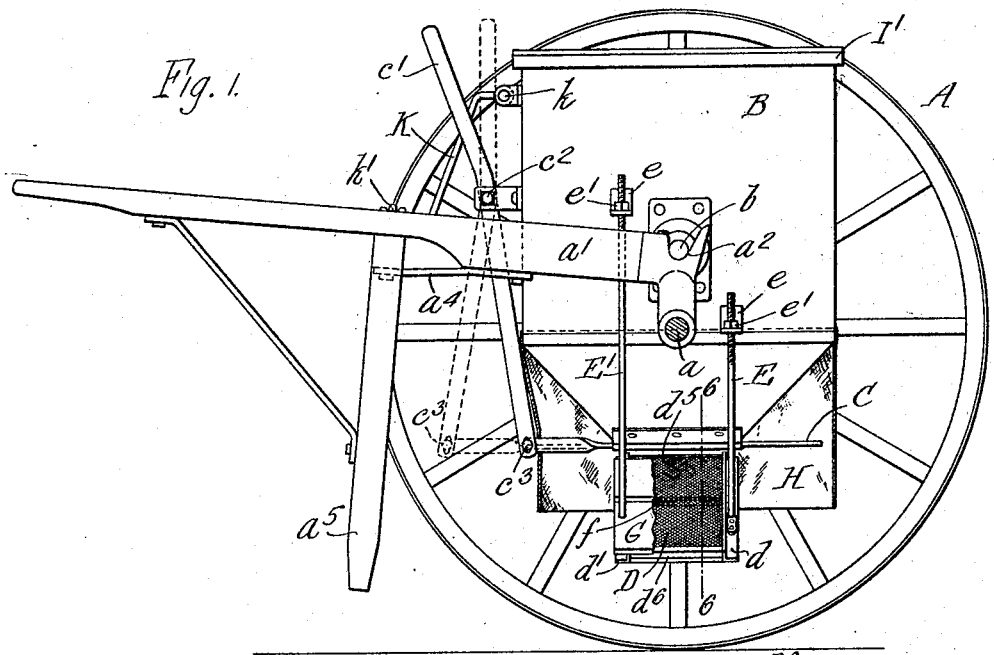
Figure 2:
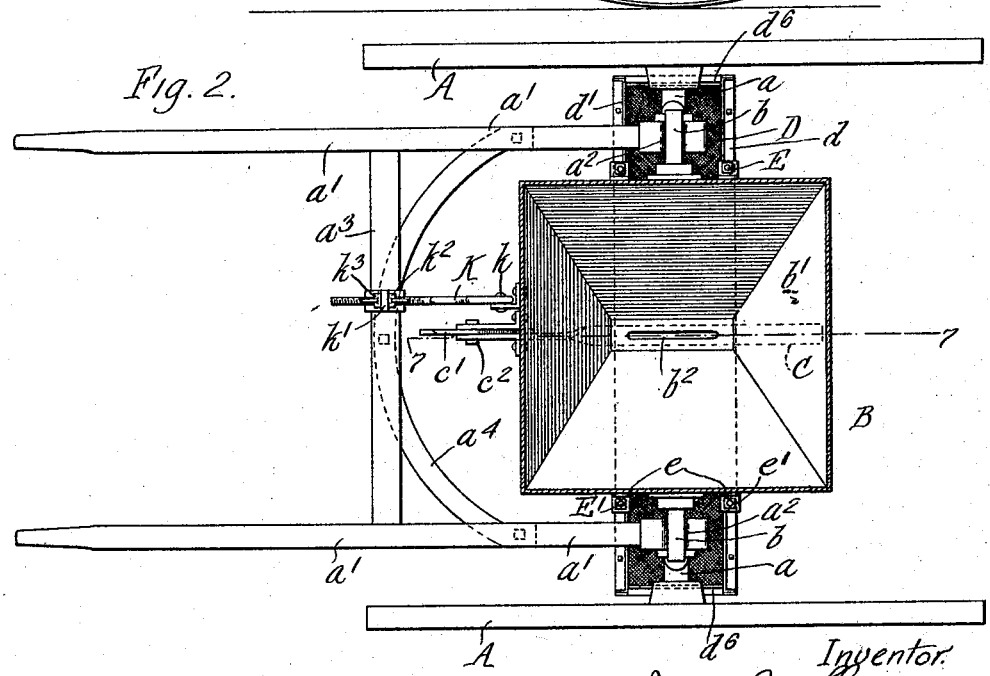

In the accompanying drawings: Figure 1 is a side elevation of a sand spreading device embodying the invention, one of the wheels of the device being omitted. Fig. 2 is a top plan view thereof with the hopper in section. Fig. 3 is a front elevation thereof partly in section. Fig. 4 is a fragmentary side elevation thereof, partly in section, showing the means for adjusting the sand hopper and parts mounted thereon relatively to the cart or truck. Fig. 5 is a fragmentary elevation thereof showing the apron or shield which surrounds the upper part of the spreading mechanism. Fig. 6 is a fragmentary transverse sectional elevation thereof on an enlarged scale, line 6—6, Fig. 1. Fig. 7 is a fragmentary longitudinal sectional elevation on an enlarged scale, on line 7—7, Fig. 2, showing the gate or valve for controlling the discharge of sand from the hopper. Fig. 8 is an end elevation, partly in section, of a distributing screen or sieve of slightly modified construction.

The spreading device is herein described as adapted to be used for spreading sand on a slippery or iced surface, but it is not intended thereby to limit the device to use in connection with sand only, since any other suitable material may be employed.

The sand spreading device consists of a hopper for the sand, and means for distributing the sand over a surface, the hopper and distributing means being mounted on a cart or truck adapted to be moved over the surface to be sanded.

The cart may be of any usual or suitable construction, that shown comprising wheels A journaled on axles $a$ projecting outwardly from side members $a'$ of the cart. The rear ends of these side members form handles for manipulating the cart, and the front portions of the side members have bearing seats or sockets $a^2$ adapted to receive trunnions or pivots of the receptacle mounted on the cart. The side members $a'$ are connected by means of a transverse member $a^3$ and a brace $a^4$ and are provided with depending legs $a^5$ which rest on the ground when the cart is not in use. B represents a hopper for the sand or other material to be spread and is provided at its opposite sides with trunnions or rods $b$ which rest in the bearing seats or sockets $a^2$ when the hopper is mounted on the cart.

The cart or truck described is of the kind in common use for street cleaning, and which, when used for street cleaning, has a barrel or container for debris or refuse mounted thereon. This barrel or container can be easily removed and replaced by the sand hopper, so that these carts can be used for sanding iced pavements in winter time, when they are not in use for street cleaning.

The hopper may be of any suitable shape, that shown having the lower portions of its sides converging toward a discharge slot or opening $b^2$ centrally arranged in the bottom thereof through which the sand to be supplied is discharged from the hopper. The discharge of sand from the hopper through the slot $b^2$ may be controlled in any suitable manner, for example by means of a gate or valve member C slidably arranged in the bottom of the hopper to close the discharge slot $b^2$, and having a slot $c$ adapted to be moved into and out of registration with the discharge slot $b^2$ in the hopper. This gate or valve member is preferably actuated by means of a lever $c'$ pivoted at $c^2$ on the hopper and pivotally connected at its lower end at $c^3$ with the gate C. The upper end of the lever $c'$ is in a position to be easily grasped by the person operating the truck and it can be readily moved into its opening position shown in full lines in Fig. 1, in which position the slots $c$ and $b^2$ are in registration, or into its closing position shown in dotted lines in Fig. 1, in which position the gate member C closes the slot $b^2$. If desired, the discharge of sand can be regulated by placing the lever at any position intermediate between those shown in Fig. 1.

The sand discharging from the discharge slot $b^2$ in the hopper drops on an inclined distributing sieve or screen and, in passing over the surface of the screen, is shaken through the meshes thereof by the vibration or jarring caused by the passing of the cart over the surface on which the sand is to be spread. In the embodiment of the invention shown in the drawings, the distributing screen comprises two distributing portions inclining downwardly and outwardly from the center of the device to the sides thereof in such a manner that the sand falling onto the upper portion of the distributing screen will pass over and through the opposite distributing portions of the screen.

The distributing screen may be of any suitable construction, that shown in the drawings consisting of a frame having front and rear members $d\ d'$, preferably made of angle iron and each having one flange arranged substantially upright, and the other flange extending outwardly. The sieve or screen D, which may be of fine or coarse mesh, depending upon the grade of sand to be spread, is secured to the lower faces of the outwardly extending flanges by means of strips $d^2$ which are suitably secured to the flanges by bolts or other means. The upright flanges of the two members $d\ d'$ are preferably partly cut away at $d^3$ to permit the screen to be moved into close proximity to the discharge slot $b^2$, and a plate $d^4$ is secured to the outwardly extending flanges of the frame members. An imperforate deflecting plate $d^5$ is arranged between the upright flanges of the frame members and is of substantially inverted V-shape, so that when the plate is centrally arranged with regard to the discharge slot $b^2$, the plate deflects the sand discharged from the hopper to the two screening portions.

The lower or outer ends of the frame members $d\ d'$ are connected by means of a metal strip or dam $d^6$ which holds back the sand which is passed over the surface of the screen and causes the same to accumulate on the lower parts of the screen when fed too freely. Any large particles, such as stones which cannot pass through the screen, can pass over the upper edge of the dam $d^6$. If desired, the dam may be omitted, as shown in Fig. 8.

The distributing screen is arranged to be adjusted relatively to the discharge opening in the hopper so that the sand can be discharged thereon as desired to effect the desired distribution over the surface to be sanded. In the construction shown, the distributing screen is suspended from the hopper by means of rods E E' having their lower ends secured to the frame of the screen and the upper ends of which are preferably screwthreaded and pass through holes in the brackets $e$ secured on the hopper. The position of the distributing screen relatively to the discharge opening in the hopper may be controlled by means of nuts $e'$ arranged on screwthreaded parts of the supporting rods. By means of these nuts the screen can be adjusted to the discharge opening in the hopper as may be desired to obtain the best distribution of sand. The amount of sand to be fed can be reduced by placing the distributing screen in close proximity to the discharge opening, or increased by placing the screen at a greater distance from the discharge opening. By lowering one side of the screen and raising the other side, the apex of the deflecting plate $d^5$ can be moved toward one side of the discharge slot to cause all of the sand to be fed to one portion of the deflecting screen, when it is desired to use only half of the screen. Any other means for adjustably mounting the distributing screen on the hopper may be employed if desired.

The passing of the sand through the meshes of the screen may be facilitated by providing the screen with a stepped surface, which may be formed by bending the frame members $d\ d'$ and the screen D, or in any other suitable manner to form the steps $f$. By thus arranging the screen in two planes to form a step, the sand in dropping from the upper to the lower surface passes more readily through the meshes of the screen. In the construction shown in Figs. 1 to 6, one step is shown in each of the inclined portions of the screen but more steps may be employed if desired, or the steps may be omitted entirely, as shown in Fig. 8.

In order to prevent rain or moisture from interfering with the sifting of the sand through the screens, the inclined portions of the distributing screen are preferably covered by means of covering devices G which may be secured in any suitable manner on the supporting frame of the screen. The lower end of the cover member G is arranged at a slight distance from the dam $d^6$ so as not to interfere with the passage of the coarse particles of the sand over the dam. In the construction shown in Figs. 1–6, the cover for the screen is made in two overlapping sections on account of the step $f$ in the screen, the sections being preferably secured together. The cover may be retained on the screen in any suitable manner, that shown being provided with holes through which the suspending rods E E' pass. To further prevent weather conditions from interfering with the proper operation of the device, an apron or protecting shield H is preferably secured on the lower part of the hopper in any suitable manner and extends downwardly below the upper portion of the distributing screen to prevent rain or moisture from interfering with the feeding of the sand from the hopper to the screen and to prevent the wind from blowing the sand from the distributing screen. In the construction shown, the apron is removably secured to the bottom of the hopper by means of a strap $h$, Fig. 5.

In order to prevent coarse particles or large stones from being dumped into the hopper, which might clog up the discharge slot $b^2$, a sieve or screen I is arranged on brackets $i$ in the top of the hopper. This screen is preferably of coarser mesh than the distributing screen so that the sand will readily pass through the same. The screen can easily be removed by lifting the same from the brackets. I' represents a lid or cover for the top of the hopper.

In order to obtain the most satisfactory operation of the sand spreading device, it is desirable that the distributing screen should not be inclined in the direction of the length of the device in such a way that the sand would tend to flow to the front or rear edge thereof. It is therefore desirable to provide means for keeping the distributing screens in the proper position whether the cart is being pushed by a tall or short man. In order to compensate for the difference in height of the men handling the sand spreading device, the following means are preferably employed:

An arm K, Figs. 1, 2 and 4, is pivoted at one end to the hopper B, as shown at $k$, and the other end of the arm is adapted to be adjustably secured to the frame of the cart. In the construction shown, this part of the arm is screwthreaded and extends through a hole in the member $k'$ secured on the frame of the cart. The arm may be adjusted relatively to the member $k'$ by means of thumb nuts $k^2$ $k^3$ engaging the threaded portion of the arm at opposite sides of the member $k'$. By means of this construction the hopper and the distributing screen suspended therefrom may be adjusted relatively to the cart by swinging the hopper about its pivotal connection in the bearing seats $a^2$, so that the hopper and the distributing screen connected therewith is maintained in the desired position.

In the operation of the sand spreading device the cart with the hopper and distributing screen mounted thereon is pushed over the surface to be sanded and the lever $c'$ is actuated to open the discharge slot $b^2$ in the bottom of the hopper. The sand passes through this slot to the distributing screen and then through the meshes of the screen, the vibration or jarring of the cart in riding over the surface to be sanded assisting in causing the sand to pass through the screen. The coarse particles in the sand which do not pass through the screen pass to the lower portions thereof and over the top of the dam $d^4$. When the cart is stopped, the lever $c'$ is actuated to interrupt the flow of sand to the distributing screen.

I claim as my invention:

1. In a device for spreading sand or analogous material, the combination with a cart, of a hopper mounted on said cart, a discharge opening in the bottom of said hopper, a distributing screen arranged below said hopper and comprising two screen portions inclining downwardly from below said opening and extending substantially from said opening to the sides of the device, the meshes of the screen being such that part of the sand passes through the screen and part of the sand passes over the surface of the screen, and means for controlling the discharge of sand from said hopper to said screen, the vibrations or shocks caused by the passing of the cart over the surface to be sanded assisting the passage of the sand through the meshes of the screen.

2. In a device for spreading sand or the like, the combination with a cart having bearing seats at its opposite sides, of a hopper removably mounted on said cart and having laterally projecting portions adapted to enter said seats for removably supporting said hopper on said cart, and sand spreading means mounted on said hopper including a distributing screen arranged below the hopper and on which the sand from the hopper passes, said screen having meshes which are so proportioned that part of the sand passes through the meshes and part of the sand passes over the surface of the screen whereby sand will be distributed by substantially all of the meshes of the screen.

3. In a device for spreading sand or analogous material, the combination with a cart adapted to be moved over the surface on which the material is to be spread, of a hopper mounted on said cart, a discharge opening in the bottom of said hopper, a distributing screen arranged below said hopper and upon which sand is discharged from the hopper and through the meshes of which the material falls on the surface on which the material is to be spread, and connections between said distributing screen and said hopper, said connections being adjustable to vary the angular relation of said screen relative to the discharge opening in said hopper.

4. In a device for spreading sand or analogous material, the combination with a cart adapted to be moved over the surface on which the material is to be spread, of a hopper mounted on said cart, a discharge opening in the bottom of said hopper, a distributing screen arranged below said hopper and upon which sand is discharged from the hopper and through the meshes of which the material falls on the surface on which the material is to be spread, and supporting rods secured at their lower ends to said distributing screen and adjustably secured at their upper portions to said hopper.

5. In a device for spreading sand or analogous material, the combination with a cart, a hopper mounted on said cart, a discharge opening in the bottom of said hopper, a distributing screen below said opening in the hopper and comprising a part inclining downwardly from said discharge opening, means for supporting said screen on said hopper, and means for adjusting said supporting means to vary the position of the screen relatively to said hopper.

6. In a device for spreading sand or analogous material, the combination with a cart, of a hopper mounted on said cart, a discharge opening in the bottom of said hopper, and a distributing screen arranged below said hopper and comprising two substantially trough-shaped portions inclining downwardly from below said opening to the sides of the device, the bottoms of said trough-shaped portions being provided with screening material extending substantially throughout the length of said trough, the meshes of the screening material being of such size as to cause the sand to remain on the surface of the screen long enough to enable the sand to cover the entire surface thereof.

7. In a device for spreading sand or analogous material, the combination with a cart, of a hopper mounted on said cart, a discharge opening in the bottom of said hopper, a distributing screen arranged below said hopper and having an inclined portion, and a cover resting on said inclined portion to prevent the material therein from becoming wet.

8. In a device for spreading sand or analogous material, the combination with a cart, of a hopper mounted on said cart, a discharge opening in the bottom of said hopper, a distributing screen arranged below said hopper and comprising two substantially trough-shaped portions inclining downwardly from below said opening to the sides of the device, the bottoms of said trough-shaped portions being made of screening material through the meshes of which the sand passes to the surface to be sanded, and a cover for said screening portions.

9. In a device for spreading sand or analogous material, the combination with a cart, a hopper mounted on said cart, a discharge opening in the bottom of said hopper, and a distributing screen arranged below said hopper and comprising an inclined substantially trough-shaped portion in which the material to be spread is confined, said trough-shaped portion having two screening surfaces, one of said screening surfaces forming substantially the continuation of the other surface, the lower end of one of said surfaces terminating a short distance above the other surface forming a step over which the material drops from the first mentioned surface to said other surface.

10. In a device for spreading sand or analogous material, the combination with a cart, of a hopper mounted on said cart, a discharge opening in the bottom of said hopper, and a distributing screen arranged below said hopper and consisting of two inclined parts extending downwardly from the discharge opening to opposite sides of said cart, said distributing screen having an upper imperforate inverted V-shaped portion arranged under said discharge opening and on which the material to be spread is dropped from the hopper, said V-shaped portion directing the sand in opposite directions to said two inclined parts.

11. In a device for spreading sand or analogous material, the combination with a cart, of a hopper mounted on said cart, a discharge opening in the bottom of said hopper, a distributing screen arranged below said hopper and comprising two screen portions inclining downwardly from below said opening to the sides of the device, and a flexible shield removably secured to said hopper and depending below and completely surrounding the upper portion of said distributing screen.

12. The combination with a cart having bearing seats at its opposite sides, of a hopper having parts projecting from the sides thereof and removably arranged in said seats for pivotally supporting said hopper on said cart, sand distributing means suspended from said hopper and extending below the same, an adjustable connection between said hopper and said cart for holding the hopper in adjusted position relatively to said cart, said connection including a rod pivotally secured at one end on said hopper, and means for adjustably clamping said other end on said cart.

Witness my hand, this 6th day of March, 1916.

JOHN M. THOMPSON.

Witnesses:
F. E. PROCHNOW,
A. L. McGEE.